United States Patent
Ma

(10) Patent No.: US 11,612,116 B2
(45) Date of Patent: Mar. 28, 2023

(54) VERTICAL TREE FELLING METHOD AND APPARATUS

(71) Applicant: UE Laboratory Inc., Long Island City, NY (US)

(72) Inventor: Xiaoqi Ma, Lawrenceville, GA (US)

(73) Assignee: UE Laboratory Inc., Long Island City, NY (US)

( * ) Notice: Subject to any disclaimer, the term of this patent is extended or adjusted under 35 U.S.C. 154(b) by 206 days.

(21) Appl. No.: 17/322,269

(22) Filed: May 17, 2021

(65) Prior Publication Data

US 2021/0352860 A1    Nov. 18, 2021

Related U.S. Application Data

(60) Provisional application No. 63/026,131, filed on May 17, 2020.

(51) Int. Cl.
*A01G 23/091* (2006.01)
*B27B 17/00* (2006.01)
*B27B 17/02* (2006.01)

(52) U.S. Cl.
CPC ........ *A01G 23/091* (2013.01); *B27B 17/0083* (2013.01); *B27B 17/02* (2013.01)

(58) Field of Classification Search
CPC ........ A01G 23/00; A01G 23/02; A01G 23/08; A01G 23/091; B27B 17/0083
See application file for complete search history.

(56) References Cited

U.S. PATENT DOCUMENTS

| | | | | |
|---|---|---|---|---|
| 2,974,694 A | * | 3/1961 | Mattila | B27B 11/04 83/745 |
| 3,168,127 A | | 2/1965 | McManama | |
| 3,225,799 A | * | 12/1965 | Hayden | B27B 17/0083 83/794 |
| 3,708,000 A | | 1/1973 | Duffly et al. | |

(Continued)

FOREIGN PATENT DOCUMENTS

| | | |
|---|---|---|
| EP | 2387303 B1 | 11/2014 |
| WO | 2008135638 A1 | 11/2008 |

OTHER PUBLICATIONS

PCT Application No. PCT/US2021/032786—International Search Report and Written Opinion dated Aug. 13, 2021.

*Primary Examiner* — Shelley M Self
*Assistant Examiner* — Jared O Brown
(74) *Attorney, Agent, or Firm* — Kane Kessler, P.C.; Barry E. Negrin

(57) ABSTRACT

A method and apparatus are provided for vertically felling trees by taking apart the trunk in a stepwise manner combining sagittal and horizontal cross-sections. A vertical frame is attachable to a tree trunk, the vertical frame having a movable portion and a fixed portion. A first cutting device is attachable to the vertical frame and configured to cut the tree sagittally substantially along a longitudinal axis of the tree. A second cutting device is attachable to the vertical frame and configured to cut the tree horizontally from an exterior of the tree to a sagittal cut made in the tree by the first cutting device. A locking mechanism releasably locks the movable portion of the frame to the fixed portion of the frame. The apparatus uses the weight of the upper trunk to maintain stability to steadily decrease the tree height until the entire tree is removed.

15 Claims, 4 Drawing Sheets

(56) References Cited

U.S. PATENT DOCUMENTS

| | | | |
|---|---|---|---|
| 3,720,246 A | | 3/1973 | David |
| 3,864,830 A | * | 2/1975 | Haddon .............. B27B 17/0083 83/745 |
| 3,965,788 A | * | 6/1976 | Granberg ............ B27B 17/0066 83/745 |
| 3,974,866 A | | 8/1976 | Saarenketo |
| 4,030,700 A | | 6/1977 | Dushku |
| 4,048,720 A | * | 9/1977 | Wheeler ............. B27B 17/0083 144/73 |
| 4,067,369 A | | 1/1978 | Harmon |
| 4,134,203 A | * | 1/1979 | Grube ................ B27B 17/0083 83/745 |
| 4,412,569 A | | 11/1983 | Barnett et al. |
| 5,975,168 A | | 11/1999 | Ericksson |
| 8,176,954 B1 | * | 5/2012 | Coulbourn, Jr. ..... A01G 23/083 144/34.1 |

* cited by examiner

VERTICAL TREE FELLING METHOD AND APPARATUS

RELATED APPLICATIONS

Priority is claimed from U.S. Provisional Patent Application No. 63/026,131 filed May 17, 2020 and entitled "Tree Maintenance Method and Apparatus", the entirety of which is incorporated by reference herein.

BACKGROUND OF THE INVENTION

Field of the Invention

The invention is directed to devices and methods for felling trees, and more specifically to devices and methods for vertically felling trees without having the tree fall over from its base.

Description of Related Art

The removal and felling of adult trees is an engineering challenge that has not changed for many years for residential and commercial clients, utilities, and municipalities. The aboveground part of a common oak with a DBH (Diameter at Breast Height) of 36 inches and trunk height of 40 feet can weigh 15,000 to 23,000 lb. Removing slender, luxuriant, and heavy objects like this is far more complicated, dangerous, and expensive than most people think.

Due to the impact or limitation of complex on-site operating factors such as confined spaces, utility lines, and other sensitive areas, the removal of hazard trees often requires a top-down pruning method instead of a tipping method. Specialized devices are installed in tractors, towering cranes, and other large mechanical equipment; even helicopters are sometimes used to remove a tree to be taken apart in a different location. The most common process is climbing the tree and lowering the tree in sections.

Conventional methods of tree felling, such as manual removal (e.g., chopping it down with an axe or sawing it near the base and pushing it over), large-scale mechanical removal, and chemical treatment, have grave weaknesses. Human operations high off the ground cannot avoid inherent high-risk and low-efficiency attributes. Large machinery is expensive, cannot easily handle cables or power lines passing between branches, and cannot adapt to narrow field conditions, etc. Finally, it often requires operators either high off the ground or using cranes or the like. Using chemical treatment on dead or dying trees with years of decay may also bring the danger of collapse. Additionally, it is difficult to remove a single tree that is next to a house, building, or other similar structure without potentially having the tree fall on that house, building, etc. Similarly, if it is desired to remove a specific tree or trees from a group of trees, it is often difficult to access the desired tree to be felled in the midst of all of the other trees surrounding it.

Trees service is a serious business. Often the planting, maintenance, or removal of trees are the cause of severe neighborhood disputes and, unfortunately, lawsuits.

The cost of cutting trees is generally considered expensive. The average price for removing a 40-foot tree that is 36 inches around will run approximately $1,000, not including the cost of making appointments and long wait times for service.

Tree cutting is also a dangerous job. Tree removal is often the most hazardous and expensive of tree care services. In 2019, statistics from the U.S. Department of Labor indicated that tree workers have an annual fatality rate of 98.8 per 100,000, . . . ranking them at the top of the list of occupational hazards in the United States. According to the American National Standards Institute: "Very few industries have a fatality rate above 30 per 100,000 . . . the fatality rate among police officers and detectives is about 13.5 per 100,000."

Accordingly, there is a long-felt need for a safer, less expensive, and easier to accomplish method of felling a tree, especially when the tree to be removed is near a structure or other trees and cannot be felled and tipped over conventionally.

SUMMARY OF THE INVENTION

The invention adopts an innovative removal method and apparatus, has a semi-automatic operation, a cost-saving structure, and is completed on the ground without the need for climbing operations, large machines, or the like. The removal of trees utilizing the inventive method and apparatus uses less workforce, higher efficiency, and excellent safety.

The principle of the method is using the combination of the apparatus, the roots, and part of the trunk as the base trunk to support the upper tree's trunk. While keeping the trunk always upright, take apart the trunk stepwise, combining sagittal and horizontal cross-sections. Continuously remove the bottom parts of the upper trunk in sections, using the weight of the upper trunk and friction between the upper and lower trunks along the sagittal cut to stabilize the process and control the lowering of the upper trunk, all while steadily helping to decrease the height of it until the entire tree is removed.

The invention includes a vertical tree-felling apparatus. In one embodiment, a vertical frame is attachable to a trunk of a tree to be felled, the vertical frame having a movable portion and a fixed portion. A first cutting device is attachable to the vertical frame and configured to cut the tree to be felled sagittally substantially along a longitudinal axis of the tree. A second cutting device is attachable to the vertical frame and configured to cut the tree to be felled horizontally from an exterior of the tree to a sagittal cut made in the tree by the first cutting device. A locking mechanism releasably locks the movable portion of the frame to the fixed portion of the frame.

Optionally, a third cutting device may be attachable to the vertical frame and configured to cut the tree to be felled horizontally from the exterior of the tree to a sagittal cut made in the tree by the first cutting device. The second cutting device is attachable to a first side of the vertical frame, and the third cutting device is attachable to a second side of the vertical frame opposite the first side.

The vertical frame may include a plurality of side beams vertically attachable to the trunk of the tree and a plurality of reinforcing plates attachable to at least two of the side beams through the sagittal cut made in the tree by the first cutting device. The vertical frame may further include a plurality of support rings, each attachable to the side beams around one side of the exterior of the tree. Optionally, the support rings may include a first set of fixed support rings fixedly attachable to the side beams around a first side of the exterior of the tree and a second set of movable support rings movably attachable to the side beams around a second side of the exterior of the tree substantially opposite the first side of the exterior of the tree. The fixed support rings are part of the fixed portion of the vertical frame, and the movable support rings are part of the movable portion of the vertical frame.

The locking mechanism may include a plurality of ratchet wheels configured to slow movement of the movable portion with respect to the fixed portion. The locking mechanism may further include at least one locking arm attachable to at least one of the ratchet wheels for selectively fixing the ratchet wheels in place and thereby fixing the movable portion with respect to the fixed portion.

Optionally, the first cutting device may include a chainsaw having a chain and a guide bar; a proximal mounting slot and a distal mounting slot may preferably be formed in the guide bar. In such a case, the first cutting device is attached to the side beams of the vertical frame via the proximal and distal mounting slots.

The invention also includes a vertical tree-felling method, comprising the following steps: a) cutting a tree to be felled sagittally substantially along a longitudinal axis of the tree a partial length of the tree to make a sagittal cut in the tree; b) cutting the tree horizontally from an exterior of the tree to the sagittal cut made in the tree a plurality of times on one side of the tree and a plurality of times on the other side of the tree to create removable substantially semicircular sections of the tree; c) horizontally removing the substantially semicircular sections of the tree; and d) repeating steps a)-c). Steps a)-d) are preferably performed without toppling the tree.

The inventive method may preferably include the following steps: e) holding the upper portion of the tree above the removed substantially semicircular sections in position while the substantially semicircular sections are removed, and f) lowering the upper portion of the tree in a controlled manner down to the lower portion of the tree below the removed substantially semicircular sections after the substantially semicircular sections are removed.

The inventive method may preferably include the following steps: g) attaching a vertical frame to the trunk of a tree to be felled, the vertical frame having a movable portion and a fixed portion, and h) locking the movable portion of the frame to the fixed portion of the frame with a locking mechanism. The locking mechanism may include a plurality of ratchet wheels configured to slow movement of the movable portion with respect to the fixed portion and at least one locking arm attachable to at least one of the ratchet wheels for selectively fixing the ratchet wheels in place and thereby fixing the movable portion with respect to the fixed portion.

Step f) above may further include the step of unlocking the locking arm and lowering the upper portion of the tree down to the lower portion of the tree.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Description will now be given with reference to the attached FIGS. 1-4. It should be understood that these figures are exemplary in nature and in no way serve to limit the scope of the invention, which is defined by the claims appearing hereinbelow.

The method of the invention is the "Sagittal-cutting and Segmentation Method" (hereinafter referred to as "the method"), and the device for implementing the method is the "Sagittal-cutting and Segmentation Apparatus" (hereinafter referred to as "the apparatus"). The principle of the method is using the combination of the apparatus, the roots, and part of the trunk as the base trunk to support the upper tree's trunk. While keeping the trunk always upright, continuously remove the bottom parts of the upper trunk in sections, using the weight of the upper trunk and friction between the upper trunk and lower trunk to steadily decrease the height of it until the entire tree is removed.

Figure 1:
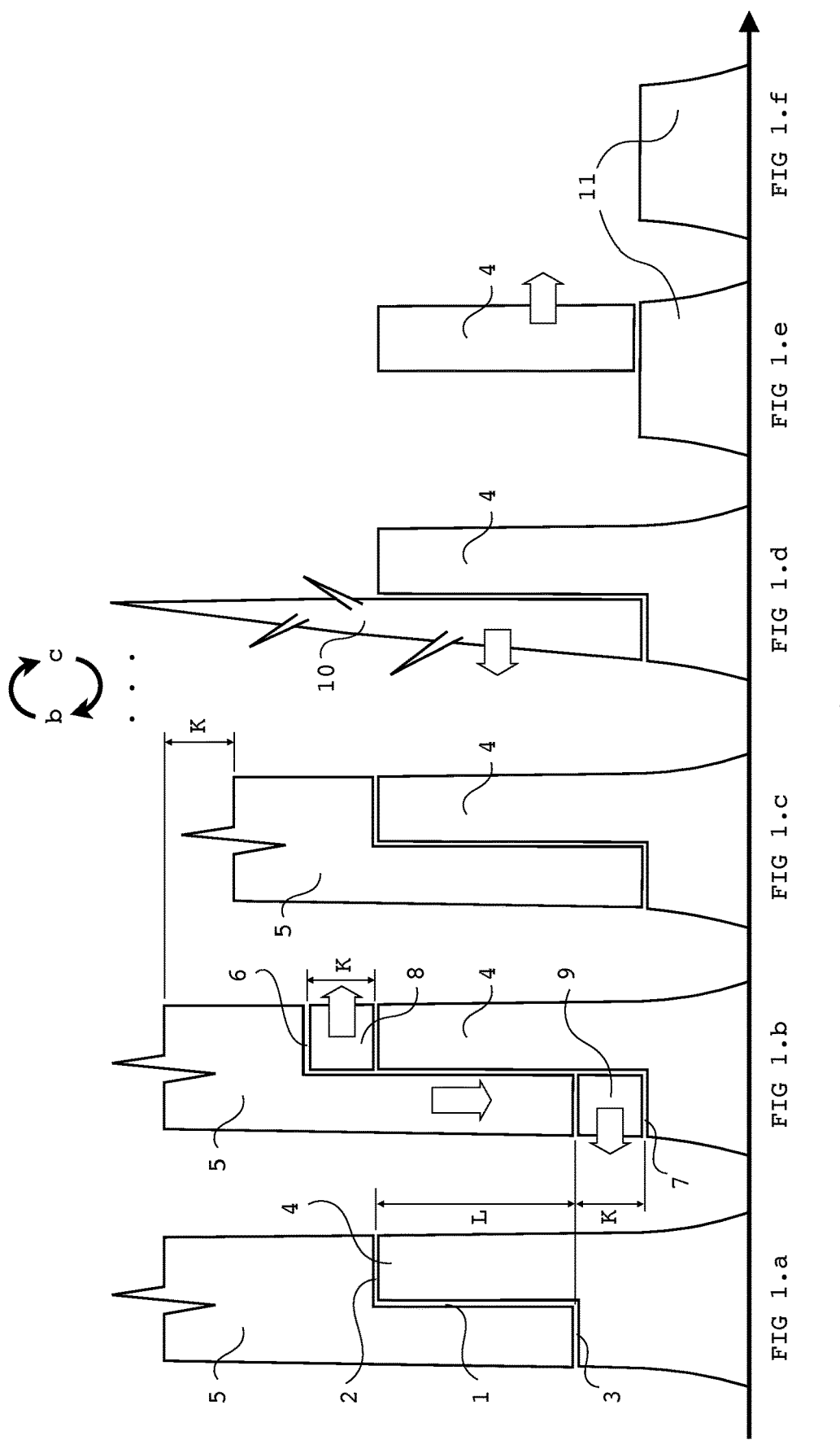
FIGS. 1a-f show a succession of schematic views of a side profile of an example of the changes in the tree's trunk during the implementation of a method in accordance with an embodiment of the invention.

FIG. 1.a-f shows the implementation process of this method through the cutting position and height change of the tree trunk. As shown in FIG. 1.a, this method creates a sagittal-section 1 with a height L on the trunk that completely penetrates the trunk. Two semicircular horizontal cross-sections 2, 3 are connected to divide the trunk into two parts: the base or lower trunk 4, and the main or upper trunk 5. As shown in FIG. 1.b, two new semicircular horizontal cuts 6, 7 are formed in the trunk to create two semi-cylindrical trunk sections 8, 9 at the bottom of the main trunk 5. Removing sections 8 and 9 (the horizontal arrow indicates the removal direction) enables the main trunk 5 to be lowered in a controlled manner as described below by a height K (the vertical arrow indicates the lowering direction). Then let the base trunk 4 reload the main trunk 5, as shown in FIG. 1.c. By repeating the cutting, removing, and trunk-lowering processes shown in FIG. 1.b to 1.c, the height of the trunk can continuously be reduced until the treetop 10 is lowered down to the ground, as shown in FIG. 1.d. Finally, remove the part of the base trunk 4, as shown in FIG. 1.e, leaving only the stump 11 shown in FIG. 1.f, thereby completing the removal of the aboveground part of the entire tree.

Figure 2:
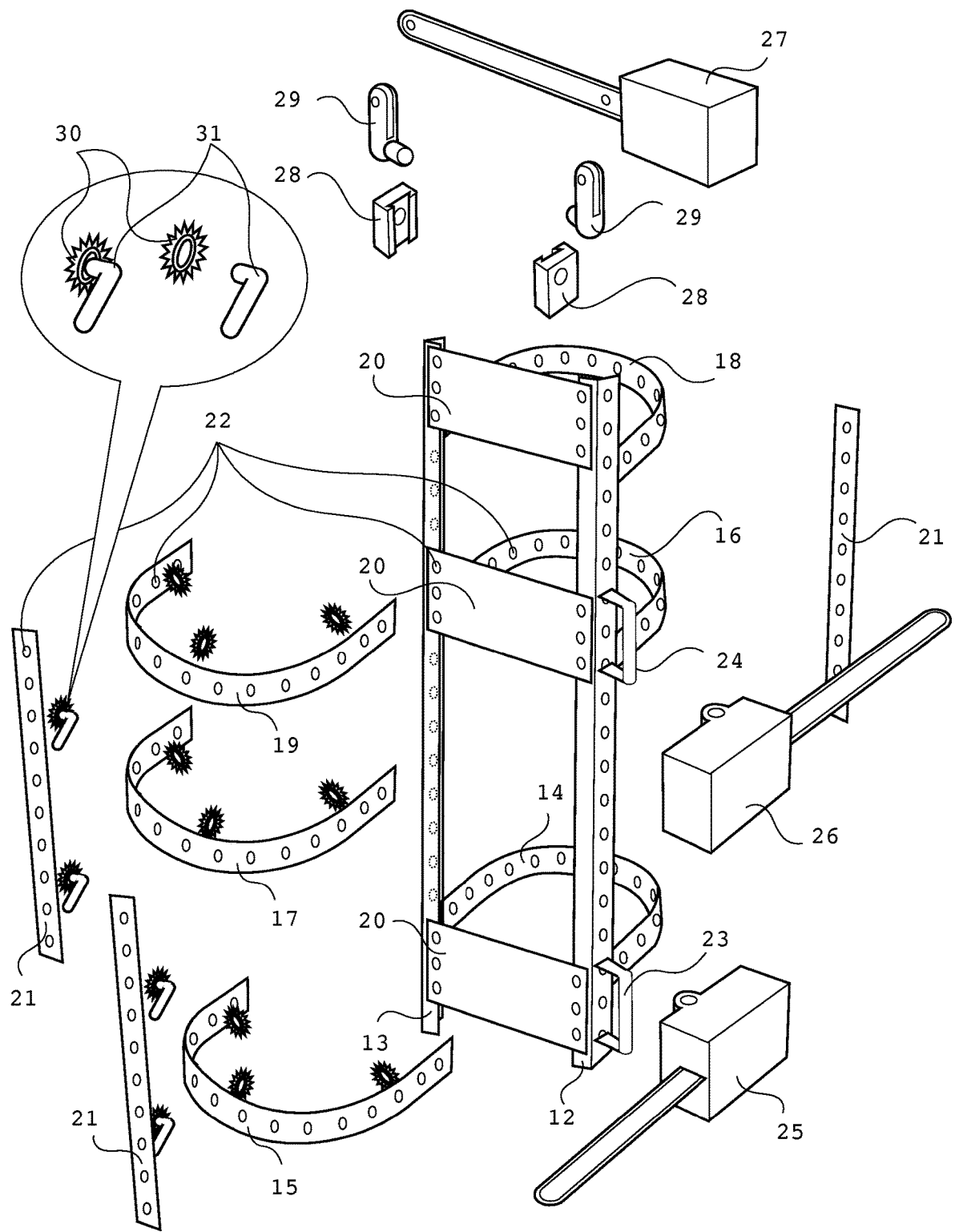
FIG. 2 is an exploded perspective view of one example of the structure, assembly, and operation of the apparatus according to various embodiments of the present invention.

FIG. 2 shows the components and connections of the apparatus. It is fastened by the side beams 12, 13 through fixed rings 14, 16, 18, and three reinforcing plates 20 and reinforcing beam 21 to form a semi-cylindrical frame structure, respectively, to strengthen the stability and firmness of the apparatus. Movable rings 15, 17, 19 can be flexibly located at their respective positions with the corresponding fixed rings 14, 16, 18. Through the pre-made uniformly distributed mounting holes 22, which spread in almost every part of the apparatus, the movable rings 15, 17, 19 are also fastened with reinforcing beam 21. The diameter D of the ring structure composed of the fixed and moving rings can be adjusted, and the spacing L, M between the upper, middle, and lower rings can also be adjusted. The mounting holes 22 near the junction of the side beam 12 with the fixed ring 14 and 16 are respectively fixed with shafts 23 and 24, with cutting devices 25 and 26 loaded on respectively. The cutting devices 25 and 26 can move in the axial direction of the shafts 23 and 24 with a stroke of K and rotate around the axis of the shafts 23 and 24 by a certain angle to achieve the corresponding horizontal cross-sections cutting operation.

Figure 4:
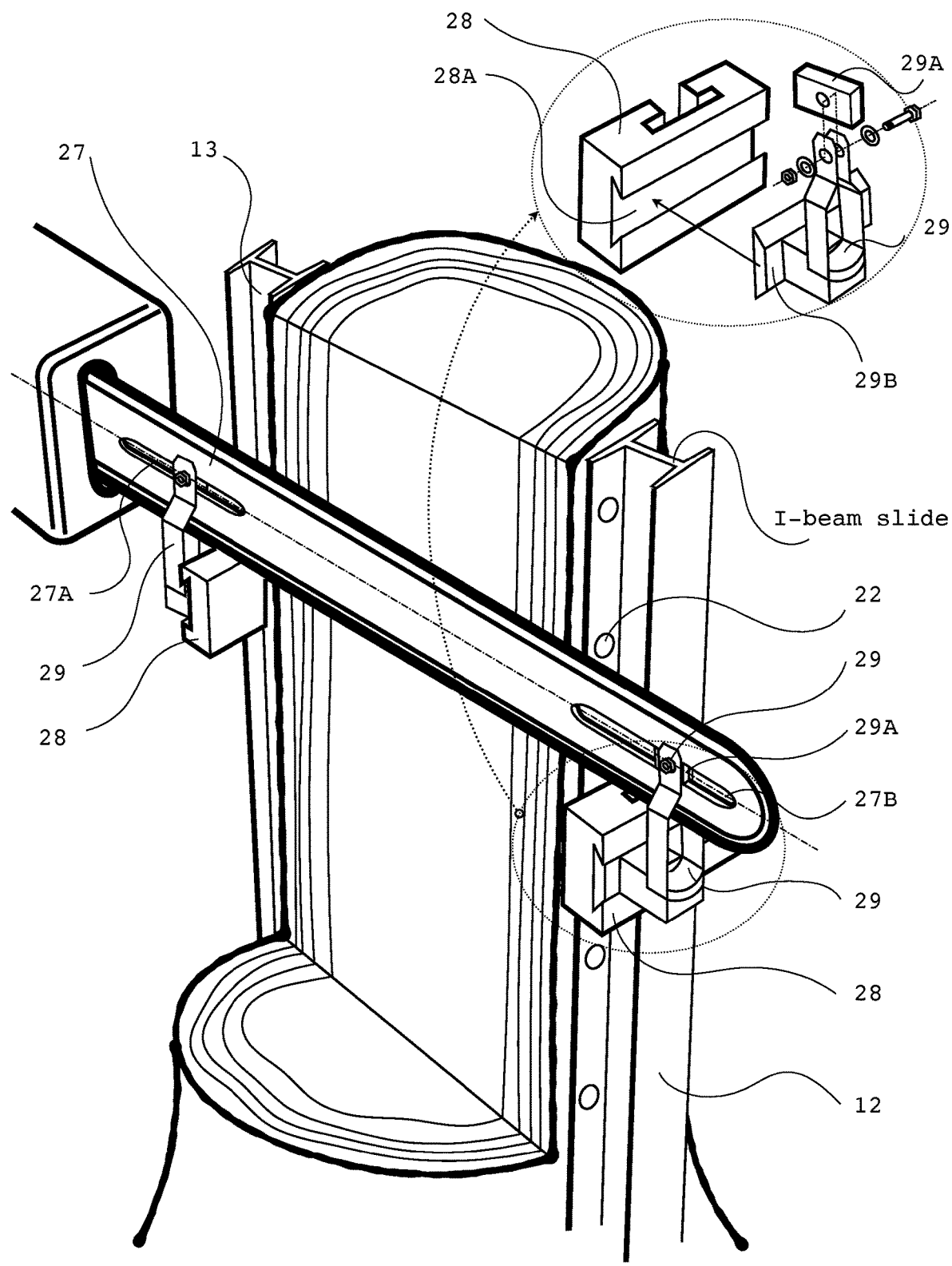
FIG. 4 is a perspective view of a sagittal cutting device attached to a vertical frame attached to a tree in accordance with an embodiment of the invention.

The two ends of the cutting device 27 are respectively connected to two sliders 28 movable on the side beams 12 and 13 through two shafts 29. As best shown in FIG. 4, in one embodiment, the cutting device 27 may be an oversized chainsaw with long holes or slots 27A, 27B formed in both ends of the guide bar. With the left end shaft 29 clamping the guide bar in the long hole 27A and the right end shaft 29 sliding in the long hole 27B, cutting device 27 can accommodate not only the change in trunk diameter as a given tree is taken down but a variety of different-sized trees, while the slider 28 slides unobstructed over the entire length of side beams 12 and 13 (shown as I-beams in FIG. 4). Slider 29A located in the long hole 27B at the right end of the guide bar allows the two shafts 29 to adapt themselves to track spacing changes and thus run on non-parallel tracks. The shaft 29 is slidable in the limit slot 28A of slider 28 via the limit slider 29B. This structure can keep the cutting line of the cutting device 27 perpendicular to the side beams 12 and 13 and can cut along the sagittal plane moving up and down, and the distance between the sagittal plane with the elevation plane where the two side beams are located can be adjusted; the sliders 28 can also move to and fix on the mounting holes 22 above the junction of the fixed ring 18 and side beams 12 and 13. The cutting device 27 can rotate around the shaft 29 at a limited angle. The cutting devices 25, 26, 27 are individually controllable and operable.

Several damping ratchets 30 can be mounted on the moving rings 15, 17, 19, and reinforcing beam 21 through the mounting holes 22. Several locking devices 31 can be added to any damping ratchet 30.

Figure 3:
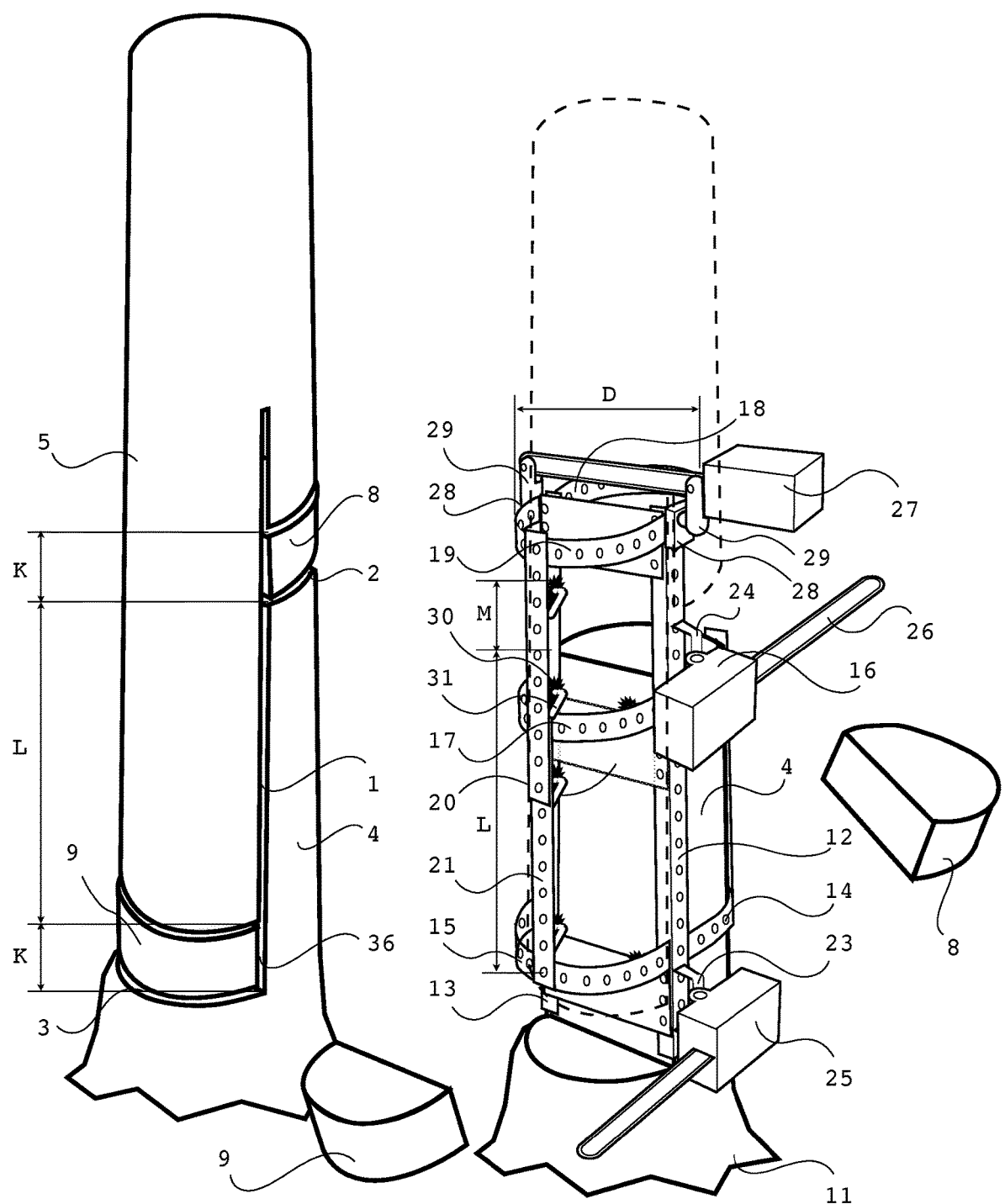
FIG. 3 illustrates a perspective view of one example of the application process of the method and apparatus according to various embodiments described herein.

FIGS. 3 and 4 show the implementation process of the method and the apparatus. In this embodiment, only the removal of a tree with a single slender trunk and few side branches is used as an example. However, the method and apparatus can accommodate trees of a wide variety of heights, widths, and configurations.

Determine the sagittal planes separating the base trunk into roughly symmetrical parts, and install the side beams 12 and 13 on the trunk with the edges coinciding on the sagittal plane. In one embodiment, the device is attached to the trunk in two ways: first, by using distributed wood bolts screwed through mounting holes 22 in the sides beams 12 and 13; second, by tightening through fixed rings 14, 16, 18. Some or all of the fixed rings 14, 16, 18 and the moving rings 15, 17, 19 are adjusted for tensioning force by an automatic tensioning device similar to a worm gear hose clamp.

Next, use the cutting device 27 to penetrate the trunk along the sagittal plane to form a cutting groove 36 perpendicular to the side beam 12 or 13. Then connect the two ends of the cutting device 27 to two sliders 28 through two shafts 29. Move sliders 28 up and down under the guidance of the side beams 12, 13 to create a sagittal section 1 of height L that completely penetrates the trunk. Finally, move and fix the sliders 28 with connected cutting device 27 up to a fixed position above the junction of the fixed ring 18 and the side beams 12, 13. It is used for the cutting of sagittal section 1 on the upper main trunk 5.

Pass the three reinforcing plates 20 through the sagittal-section 1, connected to the side beams 12, 13 and the fixed rings 14, 16, 18 at a distance L and M with the reinforcing beam 21 that need to be fastened to the trunk, respectively, forming a semi-cylindrical frame structure. The movable rings 15, 17, and 19 are installed at their respective fixed ring connection positions and connected to their own reinforcing beam 21 to form the other half of the semi-cylindrical frame structure.

Install a suitable number of damping ratchets 30 and locking devices 31 on the moving rings 15, 17, 19, and the reinforcing beam 21. Adjust the diameter D of the ring structure to securely hold the main trunk 5 through the cylindrical frame structure. One of the forces that assists in keeping the two halves of the separated trunk in a coaxial upright position is the frictional force between the trunks on the sagittal split surface, which is proportional to the tightening/compressive force exerted on the trunk by the moving rings 15,17,19. By adjusting the pressure that compresses the two trunk halves together, a few locking ratchets can be made sufficient to provide a force to control the lowering of the upper trunk.

The number and distribution of the damping ratchet 30 and the locking device 31, the diameter D of the ring structure, the semi-cylindrical trunks 8, 9 or stroke K, the height of sagittal-section 1 or ring spacing L, another ring spacing M, etc., each depend on the trunk DBH, height, shape, and weight distribution of the tree. In one embodiment, first, the trunk strength and specific gravity are measured by multi-point perforation in the field (to prevent collapse due to hollow or diseased trees), modeled on the computer using laser scanning data, and simulated and analyzed to find the appropriate sagittal location(s) and the safe fixing distance L between rings and the length K of the removed section. With the help of a laser positioning indicator device, the side beams 12, 13 can be first fixed in the same plane but not necessarily parallel, then aligned in the proper position; then cutting device 27 penetrates through the trunk and slide on the side beams 12, 13 after the shafts 29 and sliders 28 at both ends. Other methods are also contemplated as being within the scope of the invention.

Next, install the cutting devices 25, 26 at the corresponding positions near the junction of the fixed rings 14, 16, and the side beams 12 via the shafts 23 and 24. Rotate the cutting devices 25, 26 around the shafts 23 and 24 to cut the trunk to form two semicircular horizontal cross-sections 2, 3. At this time, the connected cutting planes 1, 2, and 3 divide the trunk into the base or lower trunk 4 and the main or upper trunk 5. The cylindrical frame structure of the apparatus provides the horizontal force to maintain the two-part trunks in a coaxial cylindrical shape, and the two semicircular horizontal cross-sections 2, 3 of base trunk 4 restore the vertical support to the weight of the main trunk 5.

Next, move the cutting devices 25 and 26 along the shafts 23 and 24 by a stroke K, and rotate to cut the main trunk 5 via the shafts 23 and 24, and two new semicircular horizontal cross-sections 6, 7 forms two semi-cylindrical trunk sections 8, 9 at the bottom of the main trunk 5; remove sections 8 and 9. During this process, the damping ratchet 30 and the locking device 31 maintain the position of main trunk 5 above base trunk 4 to prevent the cutting surfaces of the cutting devices 25 and 26 from being locked and crushed by heavy fall of the main trunk 5 (and to avoid injury to anyone working near the tree).

Release the locking device 31 of the damping ratchet 30 and let the main trunk 5 fall slowly under the combined action of the weight of main trunk 5, the resistance of the damping ratchet 30, and the friction between the mating vertical surfaces of main trunk 5 and base trunk 4 as compressed by the semi-cylindrical frame structure, until the base trunk 4 bears the weight of the main trunk 5 again. Repeat the above process until the treetop 10 falls to the ground and can be removed. Finally, dismantling the apparatus, use one of cutting devices 25,26,27 to remove the upper part of the base trunk 4, leave stump 11 behind, and finish the job.

As the main trunk 5 falls, its diameter continues to decrease. By adjusting the cutting device 27 to rotate around the shaft 29, the sagittal section plane 1 is continuously moved to the side of the main trunk 5 until it can fall into the cylindrical structure without sagittal cutting.

The invention is not limited to the above description. For example, other accessories, such as a rotary cutting device, a branch clamping device, a glide conveying device, and a stump removal device can be added and used to clean the trunks and side branches of complex shapes and finish the job entirely.

Having described certain embodiments of the invention, it should be understood that the invention is not limited to the above description or the attached exemplary drawings. Rather, the scope of the invention is defined by the claims appearing hereinbelow and includes any equivalents thereof as would be appreciated by one of ordinary skill in the art.

What is claimed is:

1. A vertical tree-felling apparatus, comprising:
   a vertical frame attachable to a trunk of a tree to be felled, said vertical frame having a movable portion and a fixed portion;
   a first cutting device attachable to said vertical frame and configured to cut the tree to be felled sagittally substantially along a longitudinal axis of the tree;
   a second cutting device attachable to said vertical frame and configured to cut the tree to be felled horizontally from an exterior of the tree to a sagittal cut made in the tree by said first cutting device; and
   a locking mechanism releasably locking said movable portion of said frame to said fixed portion of said frame.

2. A vertical tree-felling apparatus according to claim 1, further comprising a third cutting device attachable to said vertical frame and configured to cut the tree to be felled horizontally from the exterior of the tree to a sagittal cut made in the tree by said first cutting device,
   wherein said second cutting device is attachable to a first side of said vertical frame and said third cutting device is attachable to a second side of said vertical frame opposite said first side.

3. A vertical tree-felling apparatus according to claim 1, said vertical frame comprising:
   a plurality of side beams vertically attachable to the trunk of the tree; and
   a plurality of reinforcing plates attachable to at least two of said side beams through the sagittal cut made in the tree by said first cutting device.

4. A vertical tree-felling apparatus according to claim 3, said vertical frame further comprising a plurality of support rings, each attachable to said plurality of side beams around one side of the exterior of the tree.

5. A vertical tree-felling apparatus according to claim 4, said support rings comprising:
   a first set of fixed support rings fixedly attachable to said plurality of side beams around a first side of the exterior of the tree; and
   a second set of movable support rings movably attachable to said plurality of side beams around a second side of the exterior of the tree substantially opposite the first side of the exterior of the tree.

6. A vertical tree-felling apparatus according to claim 5, wherein said fixed support rings are part of said fixed portion of said vertical frame, and said movable support rings are part of the said movable portion of said vertical frame.

7. A vertical tree-felling apparatus according to claim 1, said locking mechanism comprising a plurality of ratchet wheels configured to slow movement of said movable portion with respect to said fixed portion.

8. A vertical tree-felling apparatus according to claim 7, said locking mechanism further comprising at least one locking arm attachable to at least one of said ratchet wheels for selectively fixing said ratchet wheels in place and thereby fixing said movable portion with respect to said fixed portion.

9. A vertical tree-felling apparatus according to claim 3, said first cutting device comprising a chainsaw having a chain and a guide bar, a proximal mounting slot and a distal mounting slot being formed in said guide bar, wherein said first cutting device is attached to said plurality of side beams of said vertical frame via said proximal and distal mounting slots.

10. A vertical tree-felling method, comprising the steps of:
    a) cutting a tree to be felled sagittally substantially along a longitudinal axis of the tree and along a partial length of the tree to make a sagittal cut in the tree;
    b) cutting the tree horizontally from an exterior of the tree to the sagittal cut made in the tree a plurality of times on one side of the tree and a plurality of times on the other side of the tree to create removable substantially semicircular sections of the tree;
    c) horizontally removing the substantially semicircular sections of the tree; and
    d) repeating steps a)-c).

11. A vertical tree-felling method according to claim 10, wherein steps a)-d) are performed without toppling the tree.

12. A vertical tree-felling method according to claim 10, further comprising the steps of:
    e) holding an upper portion of the tree above the substantially semicircular sections in position while the substantially semicircular sections are removed; and
    f) lowering the upper portion of the tree in a controlled manner down to the lower portion of the tree below the removed substantially semicircular sections after the substantially semicircular sections are removed.

13. A vertical tree-felling method according to claim 12, said step e) further comprising the steps of:
    g) attaching a vertical frame to the trunk of a tree to be felled, the vertical frame having a movable portion and a fixed portion; and
    h) locking the movable portion of the frame to the fixed portion of the frame with a locking mechanism.

14. A vertical tree-felling method according to claim 13, the locking mechanism including a plurality of ratchet wheels configured to slow movement of the movable portion with respect to the fixed portion and at least one locking arm attachable to at least one of the ratchet wheels for selectively fixing the ratchet wheels in place and thereby fixing the movable portion with respect to the fixed portion.

15. A vertical tree-felling method according to claim 14, said step f) further comprising unlocking the locking arm and lowering the upper portion of the tree down to the lower portion of the tree.

* * * * *